(12) United States Patent
Andringa et al.

(10) Patent No.: US 12,384,458 B2
(45) Date of Patent: *Aug. 12, 2025

(54) STEERING ASSEMBLY FOR VEHICLE (71) Applicant: Oshkosh Corporation, Oshkosh, WI (US)

(72) Inventors: Jeremy Andringa, Oshkosh, WI (US); Brent Radlinger, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,703

(22) Filed: Sep. 25, 2024

(65) Prior Publication Data

US 2025/0010913 A1 Jan. 9, 2025

Related U.S. Application Data (63) Continuation of application No. 18/229,250, filed on Aug. 2, 2023, now Pat. No. 12,195,124, which is a continuation of application No. 17/689,336, filed on Mar. 8, 2022, now Pat. No. 11,753,072.

(60) Provisional application No. 63/161,236, filed on Mar. 15, 2021.

(51) Int. Cl.
*B62D 7/08* (2006.01)
*B62D 7/16* (2006.01)
*B62D 7/18* (2006.01)
*B62D 7/20* (2006.01)

(52) U.S. Cl.
CPC .............. *B62D 7/163* (2013.01); *B62D 7/18* (2013.01); *B62D 7/20* (2013.01)

(58) Field of Classification Search
CPC . B62D 7/16; B62D 7/163; B62D 7/18; B62D 7/20; B62D 7/06; B62D 7/08; B62D 7/10; B62D 7/12; B62D 9/00; B62D 17/00
USPC ........................... 280/93.51, 93.512, 93.513
See application file for complete search history.

(56) References Cited

U.S. PATENT DOCUMENTS

| | | | |
|---|---|---|---|
| 2,225,966 A | 12/1940 | Beemer | |
| 3,768,825 A | 10/1973 | Magnusson | |
| 6,561,715 B2 | 5/2003 | Wasylewski et al. | |
| 6,719,311 B2 | 4/2004 | Davis et al. | |
| 10,836,425 B2 | 11/2020 | Yamazaki et al. | |

(Continued)

FOREIGN PATENT DOCUMENTS

| | | |
|---|---|---|
| CN | 108556909 A | 9/2018 |
| CN | 208602555 U | 3/2019 |

(Continued)

*Primary Examiner* — Jason D Shanske
*Assistant Examiner* — Daniel M. Keck
(74) *Attorney, Agent, or Firm* — FOLEY & LARDNER LLP (57) ABSTRACT

A front axle assembly includes an axle and a steering assembly. The steering assembly includes a pair of wheel hubs coupled to opposing ends of the axle, a steering gear mechanism configured to be positioned between (a) a first vertical plane defined by a first frame rail of the vehicle and (b) a second vertical plane defined by a second frame rail of the vehicle, and a linkage assembly coupling the steering gear mechanism to the pair of wheel hubs to facilitate steering the pair of wheel hubs through actuation of the steering gear mechanism. Components of linkage assembly do not extend through the first frame rail or the second frame rail.

18 Claims, 8 Drawing Sheets

(56) References Cited

U.S. PATENT DOCUMENTS

| | | | |
|---|---|---|---|
| 11,214,305 B2 | 1/2022 | Maltais-Larouche et al. | |
| 11,358,634 B2 | 6/2022 | Mainville | |
| 11,560,198 B2 | 1/2023 | Doerksen et al. | |
| 12,017,699 B2 | 6/2024 | Krone et al. | |
| 12,195,124 B2 * | 1/2025 | Andringa | B62D 7/08 |
| 2001/0054525 A1 | 12/2001 | Honzek | |
| 2015/0151651 A1 | 6/2015 | Stingle et al. | |
| 2019/0161115 A1 | 5/2019 | Yamazaki et al. | |
| 2019/0276102 A1 | 9/2019 | Zuleger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2021/0171137 A1 | 6/2021 | Zuleger et al. | |
| 2021/0354329 A1 | 11/2021 | Hou et al. | |
| 2022/0072736 A1 | 3/2022 | Steffens et al. | |
| 2022/0118854 A1 | 4/2022 | Davis et al. | |
| 2022/0134372 A1 | 5/2022 | Andringa | |
| 2022/0134856 A1 | 5/2022 | Andringa et al. | |
| 2022/0144058 A1 | 5/2022 | Ben-Ari | |
| 2022/0266905 A1 | 8/2022 | Krone et al. | |
| 2022/0324285 A1 | 10/2022 | Wilcox et al. | |
| 2023/0052313 A1 | 2/2023 | Cai et al. | |
| 2024/0124058 A1 | 4/2024 | Jeon et al. | |

FOREIGN PATENT DOCUMENTS

| | | | |
|---|---|---|---|
| CN | 116409376 A * | 7/2023 | B62D 5/0421 |
| DE | 102020125258 A1 * | 3/2022 | B62D 3/06 |
| EP | 1 213 206 A2 | 6/2002 | |
| JP | 6605010 B2 * | 11/2019 | B60G 21/051 |

\* cited by examiner

STEERING ASSEMBLY FOR VEHICLE

CROSS-REFERENCE TO RELATED PATENT APPLICATION

This application is a continuation of U.S. patent application Ser. No. 18/229,250, filed Aug. 2, 2023, which is a continuation of U.S. patent application Ser. No. 17/689,336, filed Mar. 8, 2022, which claims the benefit of and priority to U.S. Provisional Patent Application No. 63/161,236, filed Mar. 15, 2021, both of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a front axle assembly for a vehicle. The front axle assembly includes an axle and a steering assembly. The steering assembly includes a pair of wheel hubs coupled to opposing ends of the axle, a steering gear mechanism configured to be positioned between (a) a first vertical plane defined by a first frame rail of the vehicle and (b) a second vertical plane defined by a second frame rail of the vehicle, and a linkage assembly coupling the steering gear mechanism to the pair of wheel hubs to facilitate steering the pair of wheel hubs through actuation of the steering gear mechanism. Components of linkage assembly do not extend through the first frame rail or the second frame rail.

Another embodiment relates to a vehicle. The vehicle includes a chassis and a front axle assembly. The chassis includes a left frame rail defining a first vertical plane and a right frame rail spaced from the left frame rail, the right frame rail defining a second vertical plane. The front axle assembly is coupled to a front end of the right frame rail and the left frame rail. The front axle assembly includes an axle and a steering assembly. The steering assembly includes a pair of wheel hubs coupled to opposing ends of the axle, a steering gear mechanism positioned between the first vertical plane and the second vertical plane, and a linkage assembly coupling the steering gear mechanism to the pair of wheel hubs to facilitate steering the pair of wheel hubs through actuation of the steering gear mechanism. Components of linkage assembly do not extend through the left frame rail or the right frame rail.

Still another embodiment relates to a vehicle. The vehicle includes a chassis and a front axle assembly. The chassis includes a first frame rail defining a first vertical plane and a second frame rail defining a second vertical plane. Bottom surfaces of the first frame rail and the second frame rail define a bottom plane. The front axle assembly includes an axle coupled to a front end of the first frame rail and the second frame rail, and a steering assembly. The steering assembly includes a pair of wheel hubs coupled to opposing ends of the axle, a steering gear mechanism positioned (a) between the first vertical plane and the second vertical plane and (b) above the bottom plane, and a linkage assembly coupling the steering gear mechanism to the pair of wheel hubs to facilitate steering the pair of wheel hubs through actuation of the steering gear mechanism. The linkage assembly includes (a) one or more pitman arms coupled to the steering gear mechanism, (b) a pair of steering links coupled to the one or more pitman arms, and (c) a pair of tie rod arms coupling the pair of steering links to the pair of wheel hubs. At least one of (a) the one or more pitman arms or (b) the pair of steering links is shaped such that portions of the pair of steering links proximate the first vertical plane and the second vertical plane are positioned beneath the bottom plane and pass underneath the first frame rail and the second frame rail and do not extend through the first frame rail and the second frame rail.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle, etc.) of the present disclosure includes an axle assembly having an axle (e.g., a front axle, a solid axle, etc.), wheels coupled to opposing ends of the axle, and a steering assembly coupled to the axle that is configured to facilitate steering the wheels. Traditionally, vehicles have included an internal combustion engine that has an oil pan positioned along the bottom of the engine. When the engine is coupled to the frame, the oil pan extends down through the frame rails and occupies the space between and beneath the frame rails. This requires that various steering components be positioned outside of the frame rails. The vehicle of the present disclosure advantageously has the engine in a different position or the engine is replaced with an electric motor, which frees up the space between the frame rails that was previously occupied by the engine and engine oil pan. According to an exemplary embodiment, various steering components of the vehicle including the steering gear box can, therefore, be positioned between/beneath the frame rails, as well as facilitate removing/eliminating various steering components used in traditional steering systems (e.g., a traditional steer arm, a cross link on the axle, etc.). In addition, such positioning further frees up space outside the frame rails, which can be leveraged for the packaging of other components. In some instances, the positioning of the various steering components between the frame rails facilitates narrowing the cab of the vehicle and/or enlarging the step well used for assistance when entering the cab.

Overall Vehicle

Figure 1:
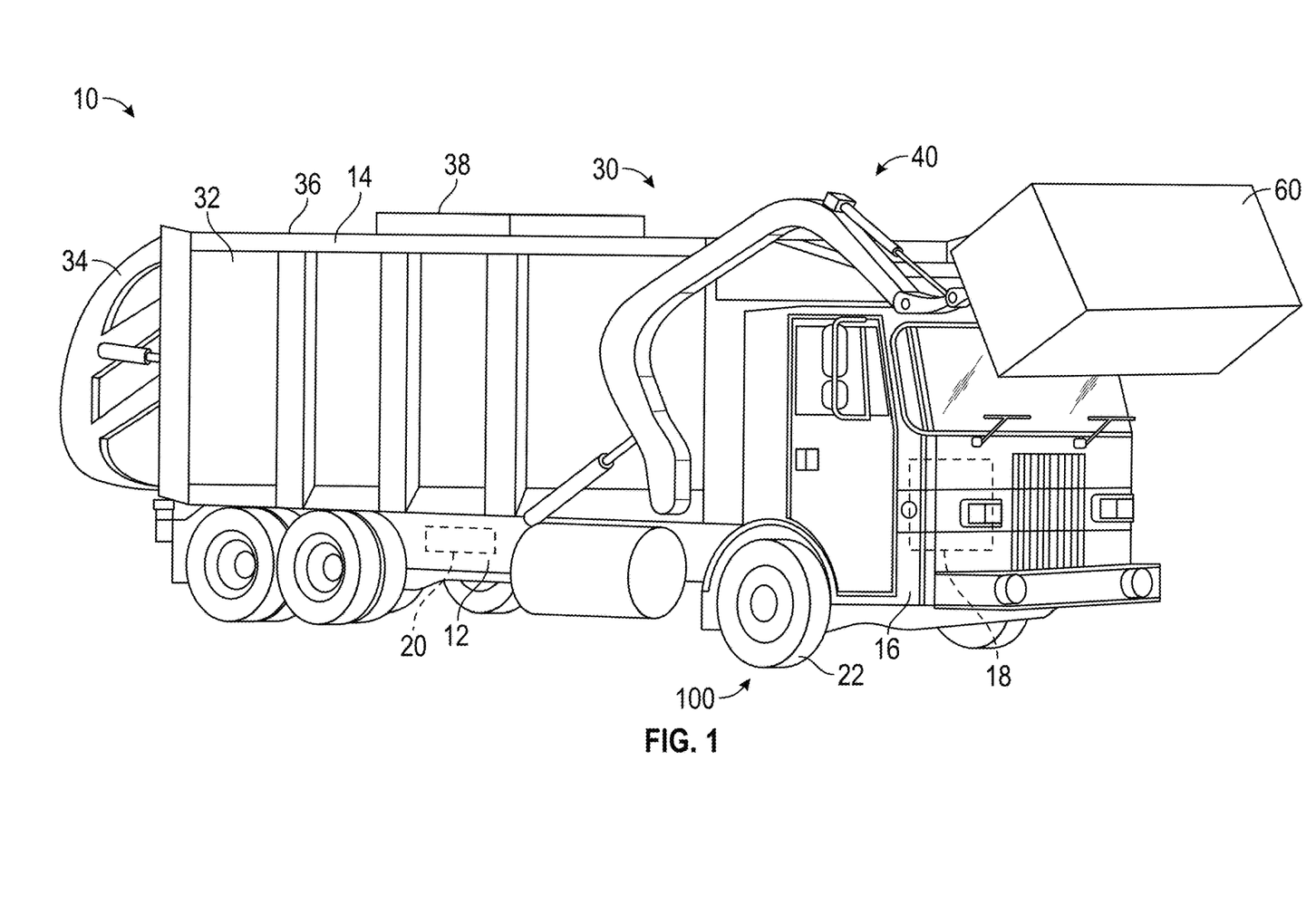
FIG. 1 is a perspective view of a refuse vehicle including an axle assembly, according to an exemplary embodiment.
Figure 2:
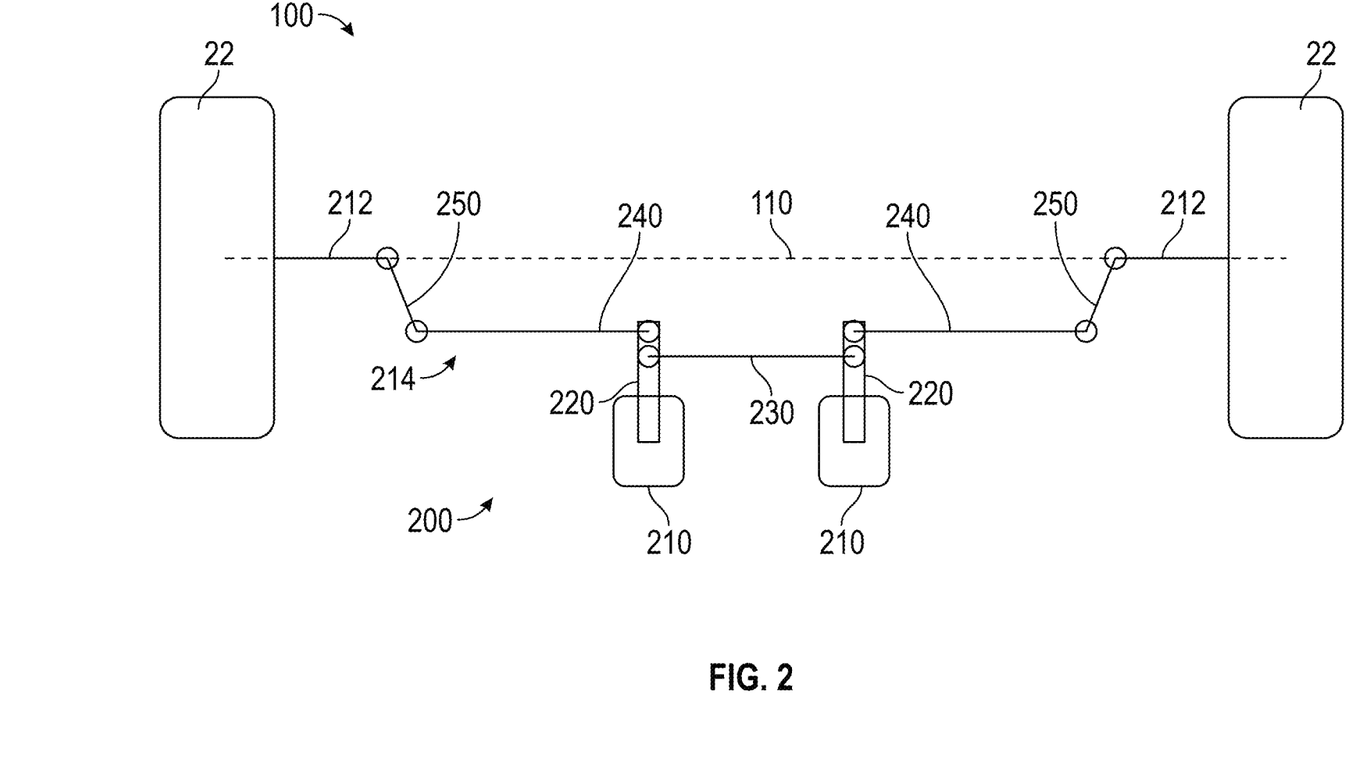
FIG. 2 is a top schematic diagram of the axle assembly of the refuse vehicle of FIG. 1 including an axle and a steering assembly, according to an exemplary embodiment.
Figure 3:
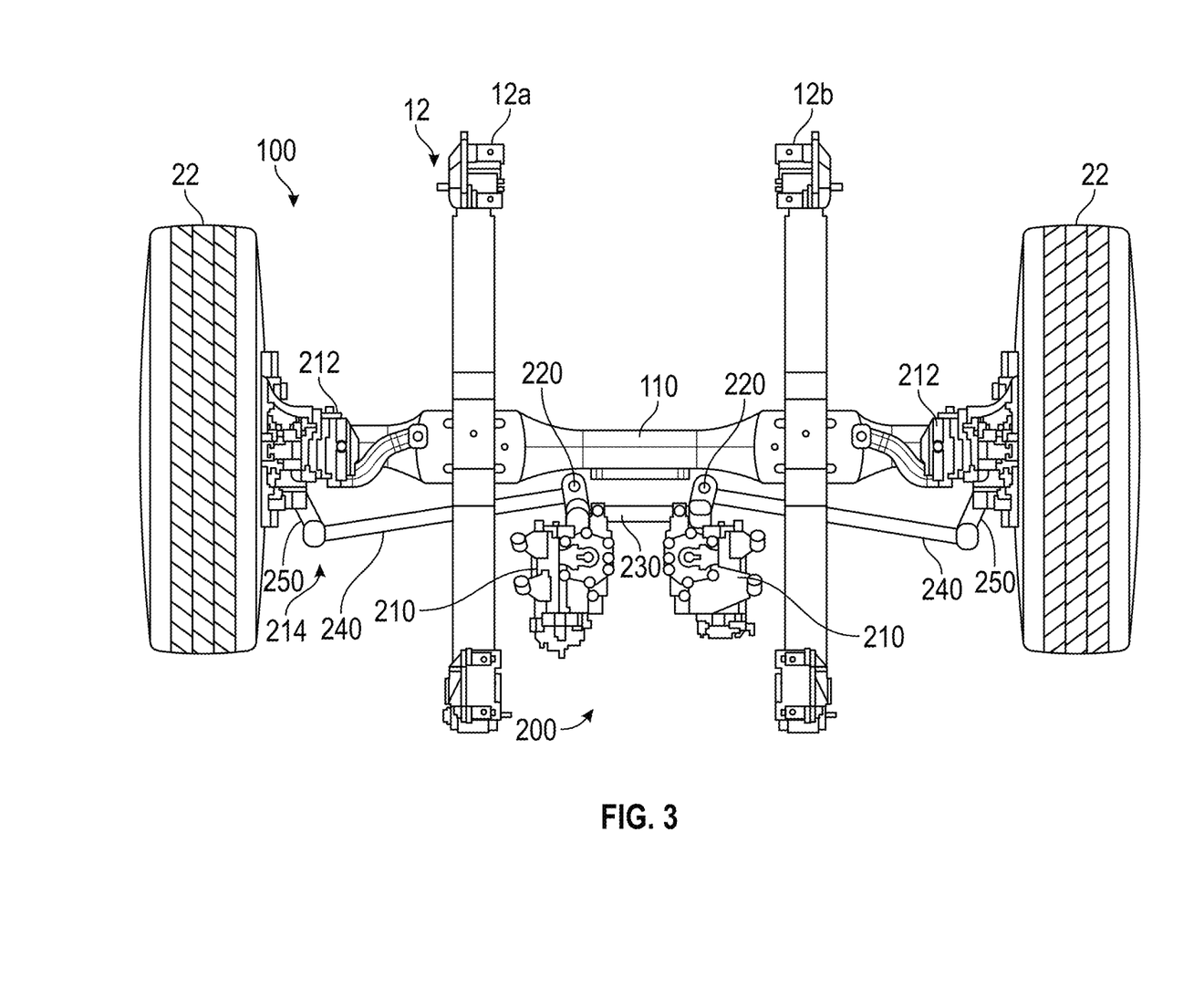
FIGS. 3-5 are various views of the axle assembly of FIG. 2 with the steering assembly in a plurality of orientations, according to various exemplary embodiments.
Figure 4:
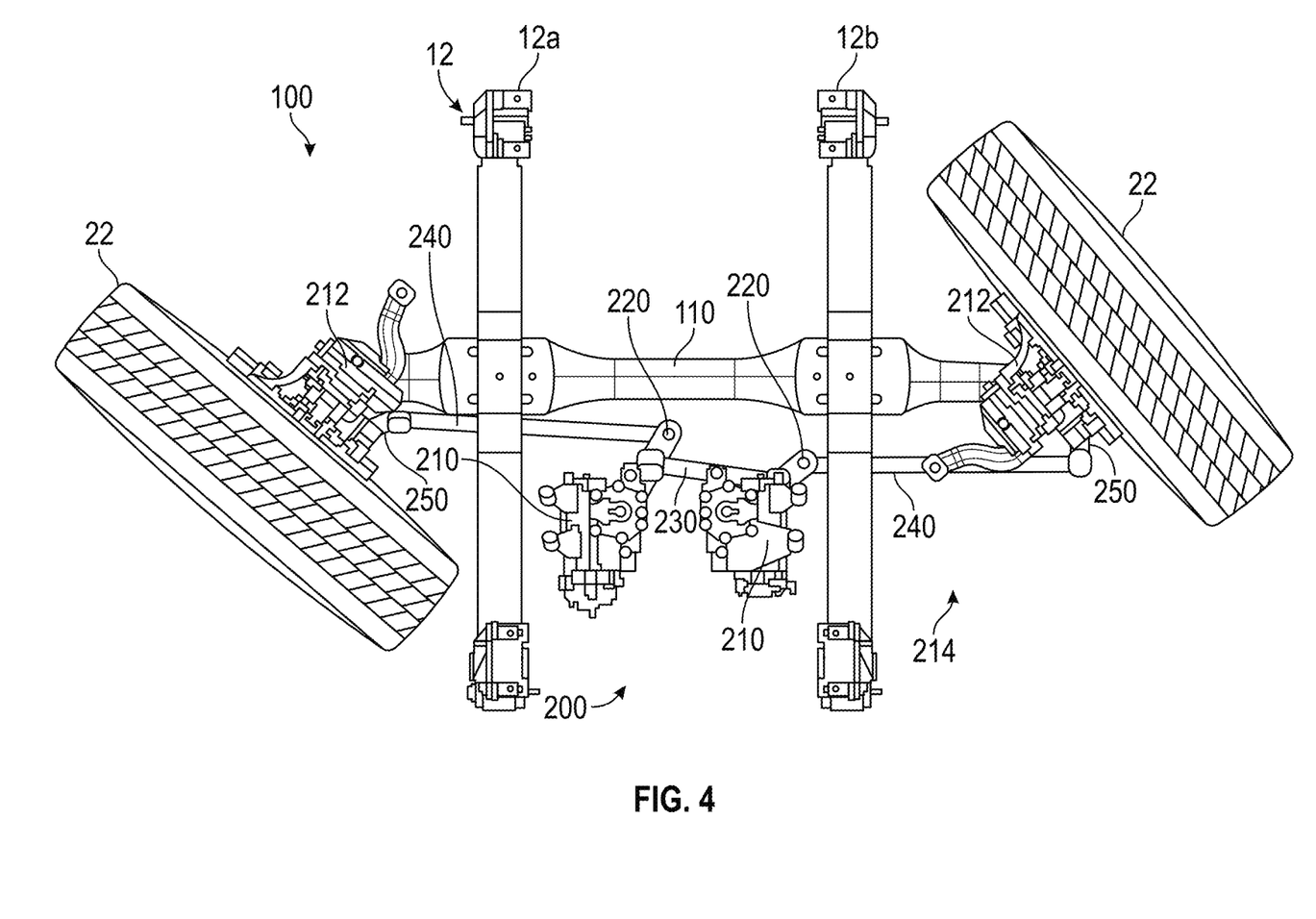
Figure 5:
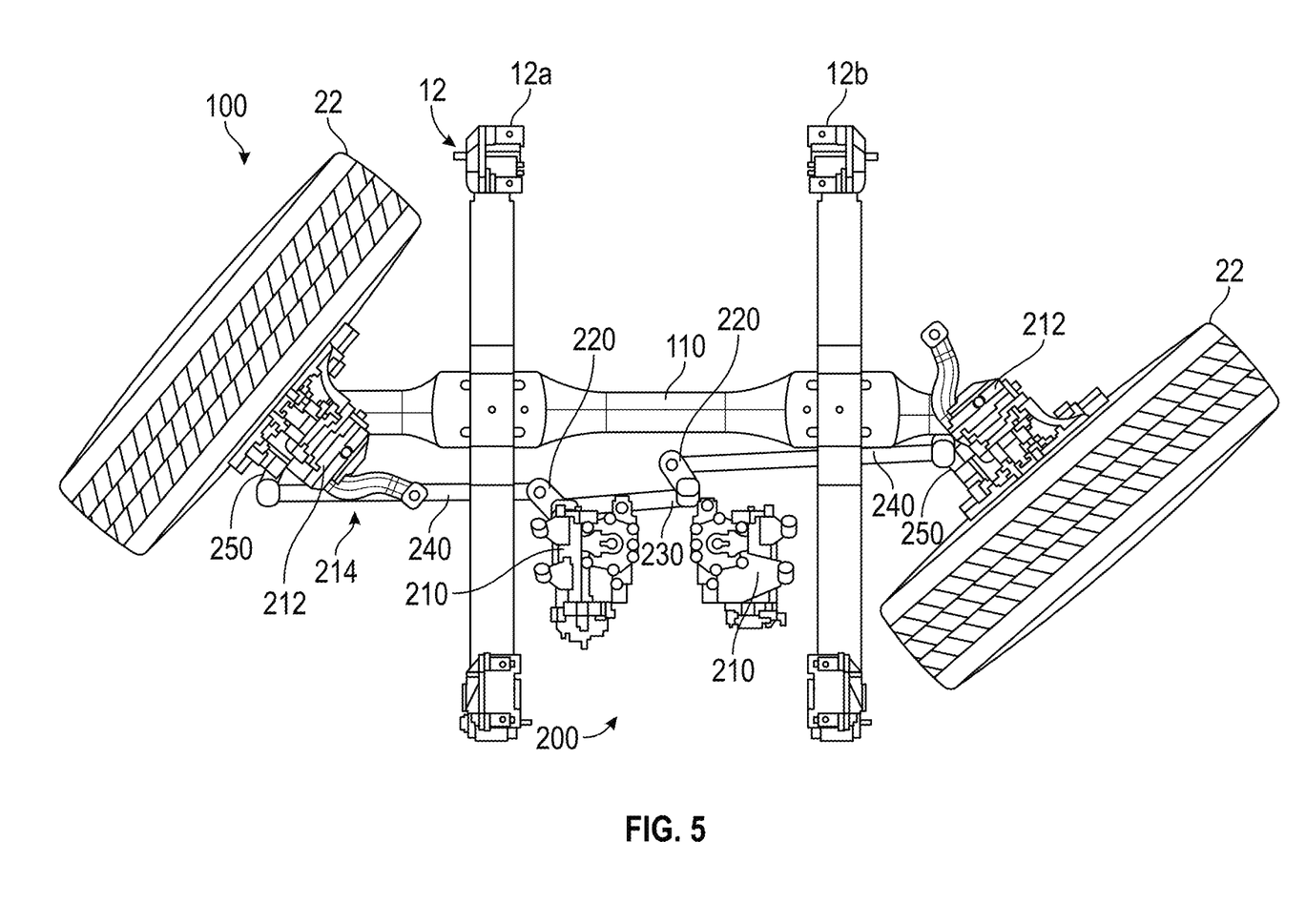

As shown in FIG. 1, a machine, shown as vehicle 10, is configured as a front-loading refuse truck (e.g., a garbage truck, a waste collection truck, a sanitation truck, a recycling truck, etc.). In other embodiments, the vehicle 10 is configured as a side-loading refuse truck or a rear-loading refuse truck. In still other embodiments, the vehicle 10 is configured as another type of vehicle (e.g., a commercial truck, a cement mixer truck, a plow truck, a military vehicle, construction machinery, agriculture machinery, etc.). As shown in FIG. 1, the vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the vehicle 10 by an operator (e.g., a seat, a steering wheel, actuator controls, a user interface, switches, buttons, dials, etc.).

As shown in FIG. 1, the vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements (e.g., via a drive shaft, etc.), shown as wheels 22, supported by axle assemblies, shown as axle assemblies 100, coupled to the frame 12 (e.g., a front end thereof, a rear end thereof, etc.). In other embodiments, the electric motor 18 is otherwise positioned and/or the vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22 (e.g., the front wheels only, the rear wheels only, both the front wheels and the rear wheels, etc.), (ii) electric actuators of the vehicle 10 to facilitate operation thereof (e.g., lift actuators, tailgate actuators, packer actuators, grabber actuators, etc.), and/or (iii) other electrically operated accessories of the vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the vehicle 10 is a completely electric vehicle. In other embodiments, the vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid vehicle, etc.). For example, the vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the vehicle 10. In some embodiments, the energy storage and/or generation system 20 includes a heat management system (e.g., liquid cooling, heat exchanger, air cooling, etc.).

According to an exemplary embodiment, the vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening, thereby preventing refuse from escaping the refuse compartment 30 (e.g., due to wind, bumps in the road, etc.).

Axle Assembly

According to an exemplary embodiment, the axle assemblies 100 include at least one steerable axle assembly (e.g., a front steerable axle assembly, front and rear steerable axle assemblies, etc.). According to the exemplary embodiment shown in FIGS. 2-8, the axle assembly 100 is a front steerable axle assembly that includes (i) an axle, shown as front axle 110, that is coupled to the frame 12 and supports a pair of the wheels 22 (i.e., front wheels) and (ii) a steering assembly, shown as steering system 200. According to an exemplary embodiment, the front axle 110 has a solid axle structure (as opposed to an independent suspension axle design). As shown in FIGS. 2-8, the steering system 200 includes one or more steering gear mechanisms, shown as steering gear boxes 210; a pair of wheel hubs, shown as wheel hubs 212, coupled to opposing ends of the front axle 110, that facilitate coupling the wheels 22 to the axle assembly 100; and a linkage assembly, shown as steering linkage assembly 214, coupling the steering gear box or boxes 210 to the wheel hubs 212. As shown in FIGS. 2-6, the steering system 200 includes a pair of steering gear boxes 210. A shown in FIGS. 7 and 8, the steering system 200 includes a single steering gear box 210. According to an exemplary embodiment, the steering gear box or boxes 210 is/are configured to couple to a steering wheel, a steering column, etc. of the vehicle 10 to facilitate steering the wheels 22 through actuation of the steering gear box or boxes 210 and, thereby, the steering linkage assembly 214 and the wheel hubs 212 (see, e.g., FIGS. 3-5).

Figure 7:
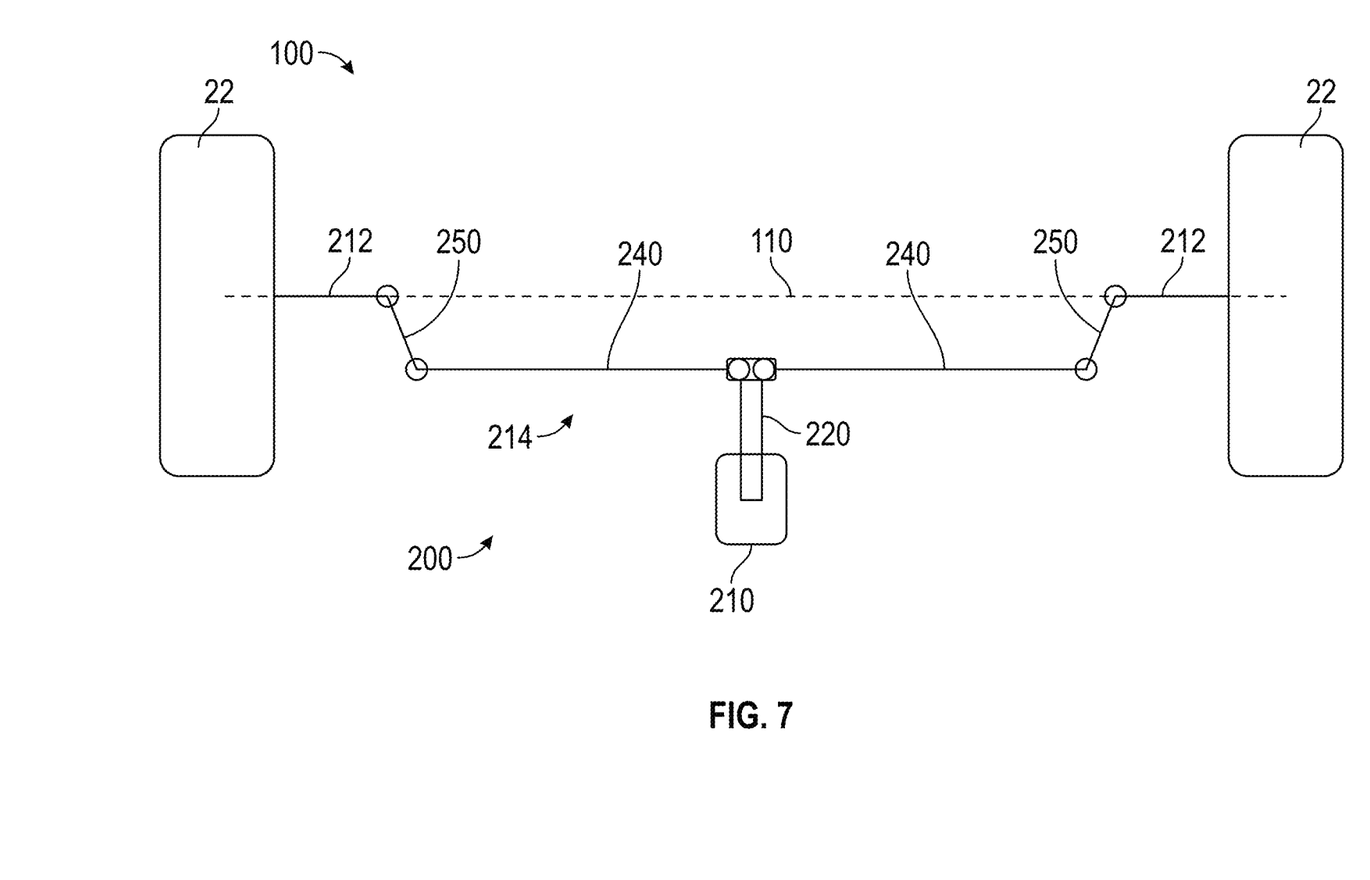
FIG. 7 is a top schematic diagram of the axle assembly of the refuse vehicle of FIG. 1, according to another exemplary embodiment.

As shown in FIGS. 2-5, the steering linkage assembly 214 includes a pair of connectors or connector arms, shown as pitman arms 220, a first linkage, shown as tie link 230, a pair of second linkages, shown as steering links 240, and a pair of third linkages, shown as tie rod arms 250. Each of the pitman arms 220 extends between and couples a respective one of the steering gear boxes 210 to a respective one of the steering links 240 (i.e., a left pitman arm 220 couples a left steering gear box 210 to a left steering link 240, and a right pitman arm 220 couples a right steering gear box 210 to a right steering link 240). The tie link 230 extends between and couples the pitman arms 220 to one another (e.g., at a position along the pitman arms 220 between the steering gear boxes 210 and a connection point to the steering links 240, etc.). Each of the tie rod arms 250 extends between and couples a respective one of the steering links 240 to a steering arm/knuckle of a respective one of the wheel hubs 212 (i.e., a left tie rod arm 250 couples a left steering link 240 to a left steering arm/knuckle of a left wheel hub 212, and a right tie rod arm 250 couples a right steering link 240 to a right steering arm/knuckle of a right wheel hub 212). As shown in FIG. 7, the steering linkage assembly 214 includes a single pitman arm 220 coupled to both of the steering links 240 and does not include the tie link 230.

Figure 8:
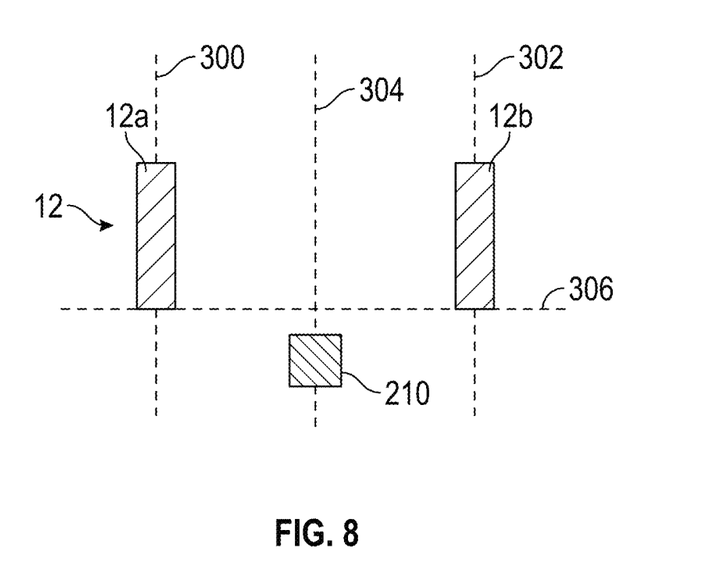
FIG. 8 is a cross-sectional schematic diagram of a portion of the axle assembly of FIG. 7, according to an exemplary embodiment.

As shown in FIGS. 3-6 and 8, the frame 12 includes a first frame rail, shown as left frame rail 12a, and a second frame rail, shown as right frame rail 12b, spaced from the left frame rail 12a (e.g., such that a space or gap is formed therebetween). As shown in FIGS. 6 and 8, the left frame rail 12a defines a first vertical plane, shown as left plane 300, and the right frame rail 12b defines a second vertical plane, shown as right plane 302. A central, longitudinal plane, shown as central plane 304, extends between the left frame rail 12a and the right frame rail 12b at a center point therebetween. The bottom surfaces of the left frame rail 12a and the right frame rail 12b extend along a bottom plane, shown as bottom plane 306.

As shown in FIG. 6, the steering gear boxes 210 are positioned between the left plane 300 defined by the left frame rail 12a and the right plane 302 defined by the right frame rail 12b. More specifically, (i) a left steering gear box 210 is positioned between the left plane 300 defined by the left frame rail 12a and the central plane 304 and (ii) a right steering gear box 210 is positioned between the right plane 302 defined by the right frame rail 12b and the central plane 304. According to an exemplary embodiment, the steering system 200 is centered along and symmetric about the central plane 304.

As shown in FIG. 8, the steering gear box 210 is (i) positioned between the left plane 300 defined by the left frame rail 12a and the right plane 302 defined by the right frame rail 12b, and (ii) positioned along the central plane 304 such that the steering system 200 is centered along and symmetric about the central plane 304. In another embodiment, the steering gear box 210 is (i) positioned between the left plane 300 defined by the left frame rail 12a and the right plane 302 defined by the right frame rail 12b, but (ii) positioned offset from the central plane 304.

Figure 6A:
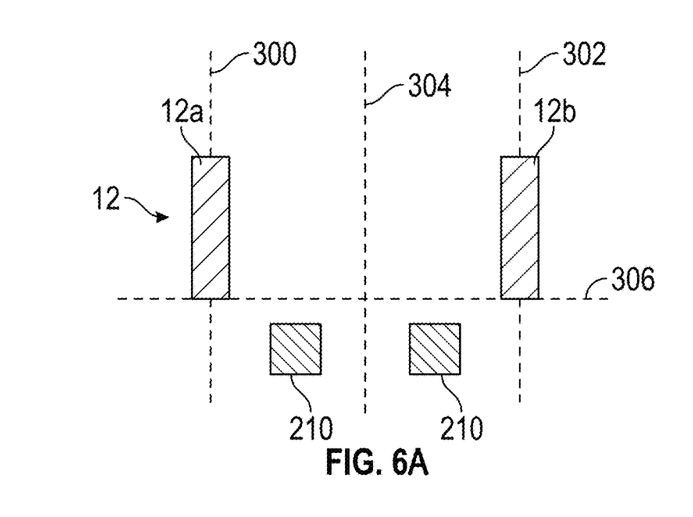
FIGS. 6A-6D are various cross-sectional schematic diagrams of a portion of the axle assembly of FIG. 2, according to various exemplary embodiments.
Figure 6B:
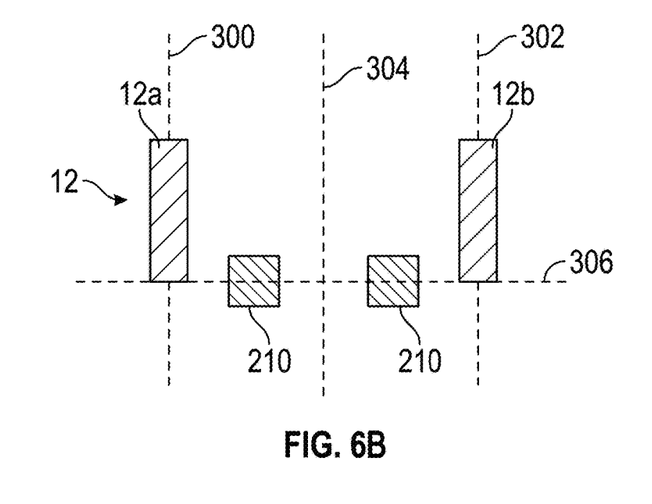
Figure 6C:
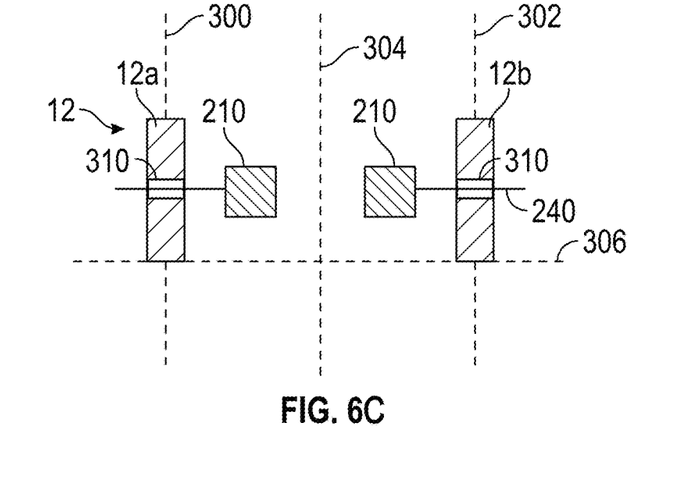
Figure 6D:
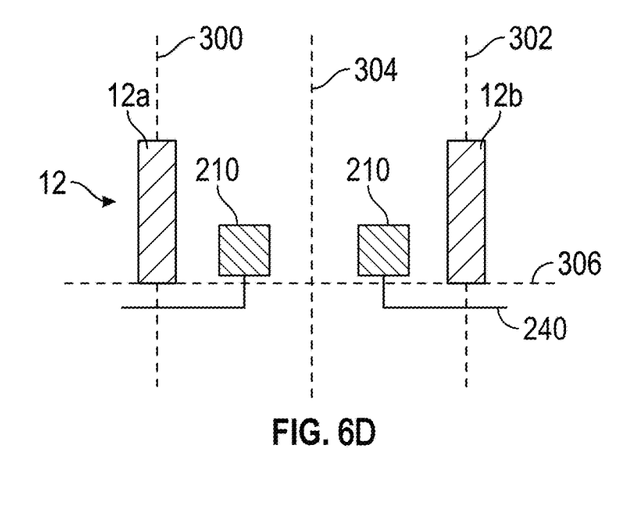

As shown in FIGS. 6A and 8, the steering gear box or boxes 210 is/are positioned entirely beneath the bottom plane 306. In another embodiment, as shown in FIG. 6B, at least a portion of the steering box or boxes 210 is/are positioned along the bottom plane 306. In still another embodiment, as shown in FIGS. 6C and 6D, the steering gear box or boxes 210 is/are positioned entirely above the bottom plane 306. In such an embodiment, (i) as shown in FIG. 6C, the steering links 240 may extend through apertures or slots 310 defined in the left frame rail 12a and the right frame rail 12b to connect to the tie rod arms 250, (ii) as shown in FIG. 6D, the steering links 240 may be shaped to curve around/beneath the left frame rail 12a and the right frame rail 12b to connect to the tie rod arms 250, and/or (iii) the pitman arm(s) 220 may drop down from the steering gear box(es) 210 such that the steering links 240 clear underneath the left frame rail 12a and the right frame rail 12b to connect to the tie rod arms 250.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle 10, the axle assembly 100, and the steering system 200 thereof as shown in the various exemplary embodiments is illustrative only. Additionally, any element disclosed in one embodiment may be incorporated or utilized with any other embodiment disclosed herein.

The invention claimed is:

1. A front axle assembly for a vehicle, the front axle assembly comprising:
   an axle; and
   a steering assembly including:
      a pair of wheel hubs coupled to opposing ends of the axle;
      a steering gear mechanism including a first gear box and a second gear box configured to be positioned between a first vertical plane defined by a first frame rail of the vehicle and a second vertical plane defined by a second frame rail of the vehicle; and
      a linkage assembly coupling the steering gear mechanism to the pair of wheel hubs to facilitate steering the pair of wheel hubs through actuation of the steering gear mechanism, wherein components of linkage assembly do not extend through the first frame rail or the second frame rail.

2. The front axle assembly of claim 1, wherein bottom surfaces of the first frame rail and the second frame rail define a bottom plane, and wherein the steering gear mechanism is positioned entirely below the bottom plane.

3. The front axle assembly of claim 1, wherein bottom surfaces of the first frame rail and the second frame rail define a bottom plane, and wherein the steering gear mechanism is positioned entirely above the bottom plane.

4. The front axle assembly of claim 1, wherein the linkage assembly includes one or more pitman arms coupled to the steering gear mechanism, a pair of steering links coupled to the one or more pitman arms, and a pair of tie rod arms coupling the pair of steering links to the pair of wheel hubs.

5. The front axle assembly of claim 4, wherein bottom surfaces of the first frame rail and the second frame rail define a bottom plane, and wherein the one or more pitman arms are shaped such that portions of the pair of steering links proximate the first vertical plane and the second vertical plane are positioned beneath the bottom plane and pass underneath the first frame rail and the second frame rail and do not extend through the first frame rail and the second frame rail.

6. The front axle assembly of claim 4, wherein bottom surfaces of the first frame rail and the second frame rail define a bottom plane, wherein the pair of steering links are shaped such that portions of the pair of steering links proximate the first vertical plane and the second vertical plane are positioned beneath the bottom plane and pass underneath the first frame rail and the second frame rail and do not extend through the first frame rail and the second frame rail.

7. A front axle assembly for a vehicle, the front axle assembly comprising:
   an axle; and
   a steering assembly including:
      a pair of wheel hubs coupled to opposing ends of the axle;
      a steering gear mechanism configured to be positioned between a first vertical plane defined by a first frame rail of the vehicle and a second vertical plane defined by a second frame rail of the vehicle; and
      a linkage assembly coupling the steering gear mechanism to the pair of wheel hubs to facilitate steering the pair of wheel hubs through actuation of the steering gear mechanism, wherein components of linkage assembly do not extend through the first frame rail or the second frame rail, wherein bottom surfaces of the first frame rail and the second frame rail define a bottom plane, and wherein at least a portion of the steering gear mechanism is positioned along the bottom plane.

8. A vehicle comprising:
   a chassis including:
      a left frame rail defining a first vertical plane; and
      a right frame rail spaced from the left frame rail, the right frame rail defining a second vertical plane; and
   a front axle assembly coupled to a front end of the right frame rail and the left frame rail, the front axle assembly including:
      an axle; and
      a steering assembly including:
         a pair of wheel hubs coupled to opposing ends of the axle;
         a steering gear mechanism including a first gearbox and a second gearbox positioned between the first vertical plane and the second vertical plane; and
         a linkage assembly coupling the steering gear mechanism to the pair of wheel hubs to facilitate steering the pair of wheel hubs through actuation of the steering gear mechanism, wherein components of linkage assembly do not extend through the left frame rail or the right frame rail.

9. The vehicle of claim 8, wherein bottom surfaces of the left frame rail and the right frame rail define a bottom plane, and wherein the steering gear mechanism is positioned entirely below the bottom plane.

10. The vehicle of claim 8, wherein bottom surfaces of the left frame rail and the right frame rail define a bottom plane, and wherein the steering gear mechanism is positioned entirely above the bottom plane.

11. The vehicle of claim 8, wherein the linkage assembly includes one or more pitman arms coupled to the steering gear mechanism, a pair of steering links coupled to the one or more pitman arms, and a pair of tie rod arms coupling the pair of steering links to the pair of wheel hubs.

12. The vehicle of claim 11, wherein bottom surfaces of the left frame rail and the right frame rail define a bottom plane, and wherein at least one of the one or more pitman arms or the pair of steering links is shaped such that portions of the pair of steering links proximate the first vertical plane and the second vertical plane are positioned beneath the bottom plane and pass underneath the left frame rail and the right frame rail and do not extend through the left frame rail and the right frame rail.

13. The vehicle of claim 12, wherein the one or more pitman arms are shaped such that the portions of the pair of steering links proximate the first vertical plane and the second vertical plane are positioned beneath the bottom plane and pass underneath the left frame rail and the right frame rail and do not extend through the left frame rail and the right frame rail.

14. The vehicle of claim 12, wherein the pair of steering links are shaped such that the portions of the pair of steering links proximate the first vertical plane and the second vertical plane are positioned beneath the bottom plane and pass underneath the left frame rail and the right frame rail and do not extend through the left frame rail and the right frame rail.

15. A vehicle comprising:
a chassis including:
 a left frame rail defining a first vertical plane; and
 a right frame rail spaced from the left frame rail, the right frame rail defining a second vertical plane; and
a front axle assembly coupled to a front end of the right frame rail and the left frame rail, the front axle assembly including:
 an axle; and
 a steering assembly including:
  a pair of wheel hubs coupled to opposing ends of the axle;
  a steering gear mechanism positioned between the first vertical plane and the second vertical plane; and
  a linkage assembly coupling the steering gear mechanism to the pair of wheel hubs to facilitate steering the pair of wheel hubs through actuation of the steering gear mechanism, wherein components of linkage assembly do not extend through the left frame rail or the right frame rail, wherein bottom surfaces of the left frame rail and the right frame rail define a bottom plane, and wherein at least a portion of the steering gear mechanism is positioned along the bottom plane.

16. A vehicle comprising:
a chassis including:
 a first frame rail defining a first vertical plane; and
 a second frame rail defining a second vertical plane;
 wherein bottom surfaces of the first frame rail and the second frame rail define a bottom plane; and
a front axle assembly including:
 an axle coupled to a front end of the first frame rail and the second frame rail; and
 a steering assembly including:
  a pair of wheel hubs coupled to opposing ends of the axle;
  a steering gear mechanism positioned between the first vertical plane and the second vertical plane and above the bottom plane; and
  a linkage assembly coupling the steering gear mechanism to the pair of wheel hubs to facilitate steering the pair of wheel hubs through actuation of the steering gear mechanism, the linkage assembly including one or more pitman arms coupled to the steering gear mechanism, a pair of steering links coupled to the one or more pitman arms, and a pair of tie rod arms coupling the pair of steering links to the pair of wheel hubs; and
 wherein at least one of the one or more pitman arms or the pair of steering links is shaped such that portions of the pair of steering links proximate the first vertical plane and the second vertical plane are positioned beneath the bottom plane and pass underneath the first frame rail and the second frame rail and do not extend through the first frame rail and the second frame rail.

17. The vehicle of claim 16, wherein the one or more pitman arms are shaped such that the portions of the pair of steering links proximate the first vertical plane and the second vertical plane are positioned beneath the bottom plane and pass underneath the first frame rail and the second frame rail and do not extend through the first frame rail and the second frame rail.

18. The vehicle of claim 16, wherein the pair of steering links are shaped such that the portions of the pair of steering links proximate the first vertical plane and the second vertical plane are positioned beneath the bottom plane and pass underneath the first frame rail and the second frame rail and do not extend through the first frame rail and the second frame rail.

* * * * *